United States Patent
Reudink et al.

(12) 
(10) Patent No.: US 6,236,849 B1
(45) Date of Patent: May 22, 2001

(54) SYSTEM AND METHOD OF DETERMINING A MOBILE STATION'S POSITION USING DIRECTABLE BEAMS

(75) Inventors: Mark Reudink, Bellevue; Curt Peterson, Mercer Island; Douglas O. Reudink, Bellevue, all of WA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

(21) Appl. No.: 09/432,958

(22) Filed: Nov. 3, 1999

Related U.S. Application Data

(62) Division of application No. 08/892,946, filed on Jul. 15, 1997.

(51) Int. Cl.[7] .................................................. H04B 7/00
(52) U.S. Cl. .......................... 455/342; 455/404; 342/457
(58) Field of Search ................................. 455/456, 404, 455/457, 440; 342/450, 451, 457, 458

(56) References Cited

U.S. PATENT DOCUMENTS

| | | | |
|---|---|---|---|
| 5,327,144 | * 7/1994 | Stilp et al. | 455/404 |
| 5,388,147 | 2/1995 | Grimes | 379/59 |
| 5,408,683 | 4/1995 | Ablay et al. | 455/33.1 |
| 5,444,451 | 8/1995 | Johnson et al. | 342/453 |
| 5,508,707 | * 4/1996 | LeBlanc et al. | 455/456 |
| 5,512,908 | 4/1996 | Herrick | 342/387 |
| 5,515,378 | 5/1996 | Roy, III et al. | 370/95.1 |
| 5,546,090 | 8/1996 | Roy, III et al. | 342/174 |
| 5,548,583 | 8/1996 | Bustamante | 370/18 |
| 5,564,121 | 10/1996 | Chow et al. | 455/53.1 |
| 5,600,706 | 2/1997 | Dunn et al. | 379/59 |
| 5,602,903 | 2/1997 | LeBlanc et al. | 379/60 |
| 5,603,089 | 2/1997 | Searle et al. | 455/53.1 |
| 5,615,409 | 3/1997 | Forssén et al. | 455/33.1 |
| 5,742,911 | 4/1998 | Dumbrill et al. | 455/562 |
| 5,745,841 | 4/1998 | Reudink et al. | 455/62 |

(List continued on next page.)

OTHER PUBLICATIONS

Krizman et al., "Wireless Position Location: Fundamentals, Implementation Strategies, and Sources of Error, " Mar. 1997.*

Yingjie Li, Martin J. Feuerstein and Douglas O. Reudink, "Performance Evaluation of a Cellular Base Station Multibeam Antenna", IEEE Transactions on Vehicular Technology, vol. 46, No. 1, Feb. 1997, 9 pages (pages are not numbered).

Kevin J. Krizman, Thomas E. Biedka and Theodore S. Rappaport, "Wireless Position Location: Fundamentals, Implementation Strategies, and Sources or Error", Mar. 1997, pp. 919–923.

Marko I. Silventoinen and Timo Rantalainen, "Mobile Station Emergency Locating in GSM", IEEE, 1996, pp. 232–238.

Mark Reudink, "Cellular Network Design and Smart Antenna Systems", IEEE, Jan. 1998, pp. 19–22.

Amotz Bar-Noy, Ilan Kessler and Moshe Sidi, "Tracking Strategies in Wireless Networks", IEEE, Aug. 1994, p. 413.

Marko Silventoinen and Timo Rantalainen, "Mobile Station Locating in GSM", pp. 53–59.

Primary Examiner—Thanh Cong Le
(74) Attorney, Agent, or Firm—Fulbright & Jaworski L.L.P.

(57) ABSTRACT

A system and method for accurately determining the position of a mobile unit operating within a predefined service area is disclosed. Three embodiments of the present invention are disclosed which teach the use of one, two and three narrow beam base transceiver stations in the determination of a mobile unit's position. Where one base station is utilized, an information map of signal attributes is used in the position determination. Where two and three base stations are used, signal strength measurements in combination with the time difference of arrival of a signal at the various base stations are used in the position determination.

47 Claims, 1 Drawing Sheet

U.S. PATENT DOCUMENTS

| | | | |
|---|---|---|---|
| 5,757,318 | 5/1998 | Reudink | 342/374 |
| 5,758,288 | 5/1998 | Dunn et al. | 455/456 |
| 5,768,686 | 6/1998 | LeBlanc et al. | 455/31.1 |
| 5,771,449 | 6/1998 | Blasing et al. | 455/422 |
| 5,781,864 | 7/1998 | Reudink | 455/560 |
| 5,809,424 | 9/1998 | Eizenhoefer | 455/456 |
| 6,026,304 * | 2/2000 | Hilsenrath et al. | 455/456 |
| 6,047,192 * | 4/2000 | Maloney et al. | 455/456 |

* cited by examiner

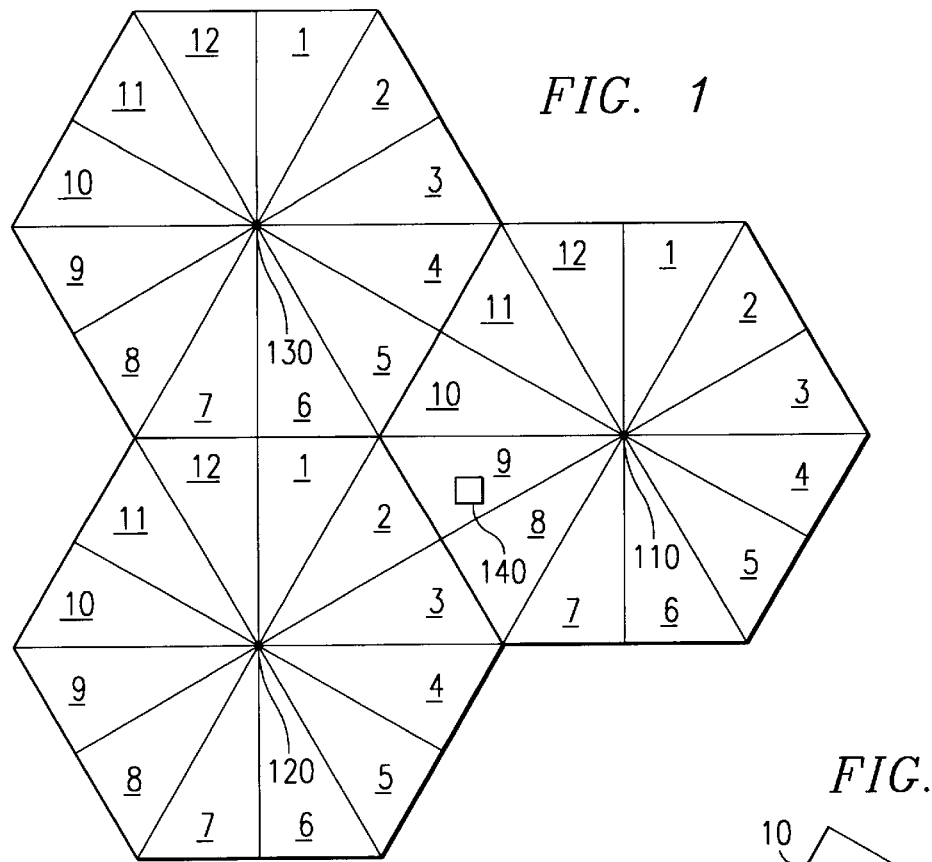
FIG. 1
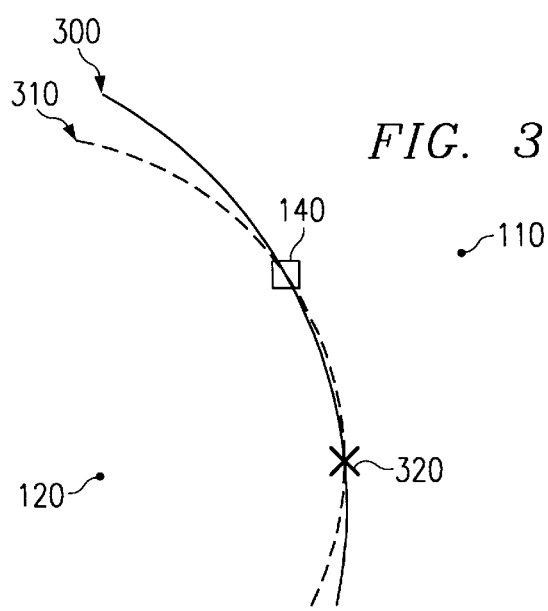
FIG. 3
FIG. 2
FIG. 4
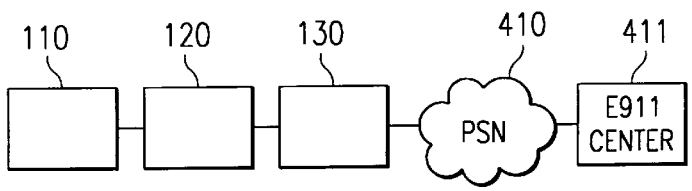

SYSTEM AND METHOD OF DETERMINING A MOBILE STATION'S POSITION USING DIRECTABLE BEAMS

RELATED APPLICATIONS

The present application is a divisional of co-pending and commonly assigned U.S. patent application Ser. No. 08/892,946, entitled SYSTEM AND METHOD FOR 911 CELLULAR LOCATION DETERMINATION, filed Jul. 15, 1997, the disclosure of which is incorporated herein by reference. Reference is hereby made to the following four and commonly assigned U.S. patent applications: NARROW BEAM WIRELESS SYSTEMS WITH ANGULARLY DIVERSE ANTENNAS, Ser. No. 08/726,277, issued May 26, 1998 as U.S. Pat. No. 5,757,318; METHOD AND APPARATUS FOR IMPROVED CONTROL OVER CELLULAR SYSTEMS, Ser. No. 08/582,525, issued Mar. 16, 1999, as U.S. Pat. No. 5,884,147; CELLULAR SYSTEM SIGNAL CONDITIONER WHICH OVERRIDES A DISCONNECT FOR ACTIVE RADIOS WIRELESSLY COMMUNICATING WITH MOBILES LOCATED IN PRE-IDENTIFIED TERRITORIAL POSITIONS, Ser. No. 08/651,980, issued Jul. 14, 1998, as U.S. Pat No. 5,781,864; and SYSTEM AND METHOD FOR CELLULAR BEAM SPECTRUM MANAGEMENT, Ser. No. 08/651,981, issued Apr. 28, 1998, as U.S. Pat. No. 5,745,841, the disclosures of which applications are incorporated herein by reference.

TECHNICAL FIELD

This invention relates to cellular communications, and more specifically, to the determination of a mobile cellular communication device location when operating within a cellular system.

BACKGROUND

Since its introduction for use by the general public in the early 1980's, mobile communications, utilizing cellular telephone technology has experienced phenomenal growth. When initially introduced, infrastructure costs associated with establishing mobile switching offices (MSO) as well as the various base transceiver stations (BTS) providing signal coverage defining communication cells, caused cellular telephony to be expensive to the user. Likewise, these infrastructure costs demanded that cellular service providers (CSP) initially provide cellular service only in metropolitan areas where the number of potential subscribers would be maximized.

As cellular service areas have matured, and the number of subscribers have grown, CSPs have continuously expanded their service areas to include less populated areas, and even rural service areas. Today it is not uncommon, and even expected, that continuous cellular coverage will be available to subscribers on extended cross country journeys.

This proliferation of cellular service has not only caused the service to be available to ever increasing areas of the country, but has also driven down the cost of the service such that it is affordable to a large number of the population. It is common today not only for business persons to remain in touch with the office through the use of cellular telephony but, due to their affordable nature, for family members to utilize the technology to remain in touch during leisure times as well.

This wide spread use of cellular communications has been a boon to society in that instant communication is very often available during emergencies. It is not uncommon for passersby to possess a cellular telephone and notify authorities, such as through dialing a local 9-1-1 system, immediately upon the occurrence of a vehicular accident, even when such an accident occurs in a remote area. Likewise, there have been numerous occasions where a citizen has witnessed undesired behavior, such as operation of a vehicle under the influence of drugs or alcohol, and been able to notify authorities through the use of cellular telephony before disastrous consequences have transpired.

However, as most enhanced 9-1-1 (E-9-1-1) systems are unable to determine the position of a mobile phone, these reports to authorities are limited in their usefulness as they often are dependent on the caller being able to accurately describe his/her position. Often times, a caller may not know his/her position with a great deal of certainty, or in the excitement of the moment may misstate the location. Furthermore, where the caller is the victim of the tragedy, the caller may be unable to clearly speak with the authorities so contacted, or may have only time enough to dial the 911 code.

Similarly, information regarding the position of a mobile unit may be useful in the operation of the cellular system. For example, where known gaps in cellular communication coverage exist in the system, such position information may be utilized by the system to adjust resources in order to avoid interruptions in the communication or to broadcast an announcement that the service will continue when the gap is cleared. Utilization of such information to improve cellular communication is disclosed in the above-referenced co-pending commonly assigned U.S. patent application entitled "Cellular System Signal Conditioner." However, as the positioning information is utilized for system control operations, as above, it is necessary to automatically determine the mobile unit's position.

Therefore, it is advantageous for a cellular system to use a method to automatically determine a mobile unit's position. Further fueling the implementation of such capabilities are various government entities directing cellular operators to have the ability to determine the location of an active mobile communication unit within a predetermined levels of accuracy. Such demands dictate that an accurate and reliable system be developed and deployed rapidly. However, the above described proliferation of cellular service necessitates that a great many BTS sites be adapted for such location determinations.

Current technology has utilized signal triangulation well known in the art to determine a mobile unit's location. However, such systems are by design limited to determining the position of origination of a signal in communication with three spatially diverse BTSs.

In rural areas, where demand for cellular service is not great, BTSs are typically spaced a maximum distance apart in order to provide cellular coverage for as large an area as possible with as little infrastructure cost as is possible. These widely spaced BTSs provide a minimum communication overlap, and thus reduce the possibility of a mobile system being in communication with two such BTSs, much less the three BTSs necessary for position triangulation. This problem is further exasperated by the fact that a great number of mobile units in use today are of the handheld variety which utilize lower power than vehicle-mounted units. These handheld units often experience marginal signal strength even with the rural BTS nearest their position. Therefore, prior art systems for determining mobile unit position are very limited in their usefulness in such areas.

In urban areas, where numerous BTSs are distributed in relatively close proximity in order to provide increased capacity, it is often possible to detect a mobile unit's signal on the three BTSs necessary for triangulation. However, in urban environments, typically there exists large structures causing reflected signals and, thus, erroneous measurements of distance as necessary for triangulation.

A need therefore exists in the art for a system and method enabling the automated determination of position of a mobile communication unit operating within the coverage area of a single radio transceiver station.

A further need exists in the art for a system and method providing for the accurate determination of the position of a mobile communication unit, although operating within communication range of three radio transceivers, who's signal is subject to indirect communication caused by ground clutter.

A yet further need exists in the art for a cost effective, yet accurate and reliable, system which may be implemented with a minimal amount of infrastructure cost associated with its deployment.

SUMMARY OF THE INVENTION

These and other objects, needs and desires are obtained in a system and method utilizing multiple narrow beams in conjunction with signal strength and/or time difference of arrival information to determine the location of a mobile communication unit. Systems for implementing multiple narrow beams in wireless communications are disclosed in the above-referenced co-pending commonly assigned U.S. patent application entitled "Narrow Beam Wireless Systems With Angularly Diverse Antennas."

Through the use of narrow beams at the BTS site, the present invention is capable of accurately determining the position of a mobile unit when able to detect its signal at as little as one BTS. However, in order to locate a mobile unit who's signal is measurable at only a single BTS according to the present invention, an information map of the BTS's coverage area must be developed.

Therefore, in a first preferred embodiment of the present invention an information map of a mobile unit's communication attributes at locations throughout the BTS's coverage area is developed. Such a map may consist of a signal strength map of the mobile unit's signal on each (or some subset thereof) narrow beam when located at particular positions. Additionally, or in the alternative, such maps may consist of time difference of arrival (TDA) of the signal coming in on one beam versus the times on the other beams in communication with the unit when located at particular positions.

Likewise, as it is expected that a large number of mobile users will be automobile born, road map information, or other representations of common position possibilities, may be utilized. Utilizing road map information in combination with direction information with respect to the movement of the mobile unit, as may be determined through referencing changing signal conditions at ones of the multiple beams, the present invention may determine the mobile's position. Of course, where such road map information includes many possibilities as to a mobile's position based on its direction, additional information, such as signal strength to determine a distance from the BTS, may also be used. Furthermore, the information map may not only include the road map information, but may also include the recorded signal attributes described above.

Of course, all of the above described measurements may be made in the forward channel rather than the reverse channel, such as by transmitting different signals on the various beams, if desired. Both forward and reverse channel measurements may be made to provide additional confidence in any location determination made. Of course, for forward channel measurements to be utilized in the location determination by the BTS, this information must be communicated from the mobile unit to the BTS. Therefore, the measurements in the reverse channel are preferred.

Through comparing the current attributes of a mobile unit's signal on the various narrow beams of the BTS to the information map identifying attributes with particular positions, a single BTS may accurately pinpoint the position of the mobile unit. However, it shall be appreciated that such an embodiment of the present invention necessitates the pre-preparation of the information map so utilized. Although the information relationship so mapped for many positions within the BTS's coverage area may be interpolated or extrapolated from actual field measurements, such information mapping still necessarily requires significant planning and setup in order to be operational.

Therefore, a second preferred embodiment of the present invention utilizes two BTSs having narrow beams to determine the position of the mobile unit. As above, this embodiment utilizes signal strength and TDA information in its determination of the mobile's location. However, as two spatially diverse base units are utilized in the position determination, the mapping of this information in advance of the determination is not necessary. Of course, measurements may be made in the forward or reverse channels as discussed above, with respect to information mapping, if desired.

Through the use of two BTSs, the mobile unit's location may be determined by a first BTS determining the strongest narrow beams upon which the mobile's signal appears. The position of the mobile is typically within one such beam as the strongest signal indicates the shortest, most direct route, between the mobile and the base. However, as this information alone is insufficient to determine the position of the mobile more accurately than the coverage area of a narrow beam, a second BTS is utilized.

The second BTS is able to use TDA information to independently determine two possible positions for the mobile. Thereafter, the location determination may be made by comparing the information of the first and second BTSs. The single position of these two possible positions determined by the second BTS which falls within the beams having the strongest signal as determined by the first BTS will be the position of the mobile unit.

It shall be appreciated that this preferred embodiment of the present invention utilizes information shared between multiple BTSs. Moreover, in order to make the TDA determination, the second BTS preferably scans the control channel of the first BTS. The number of narrow beams upon which the second BTS scans for the control channel of the first BTS may be limited by referencing the information with respect to the beams having the strongest signal as determined at the first BTS. As such, it shall be understood that information communication between such BTSs is utilized by the present invention. Methods and apparatus for implementing such intercommunication for actively managing calls throughout a plurality of cells are disclosed in the above-referenced co-pending commonly assigned U.S. patent application entitled "Method and Apparatus for Improved Control Over Cellular Systems."

In a third preferred embodiment, a third BTS is utilized in the position determination of the mobile. Of course, the combination of three base stations may be utilized to make the position determination through the aforementioned triangulation technique, if desired. Preferably, however, this third BTS is used to verify the position determination as made by two base stations described above. The third BTS is able to independently confirm the mobile's position as determined through the use of two base stations. Such independent confirmation is able to reveal anomalous position determinations and, thus, provide a higher level of confidence in the mobile's location.

It shall be appreciated from the foregoing, that a technical advantage of the present invention is realized by its ability to accurately determine the position of a mobile communication unit by reference to signals received at a single base station.

A further technical advantage of the present invention is that the position of a mobile communication unit may be determined through reference to a signal seen at only two base stations.

A yet further technical advantage of the present invention is that, through the optional use of the three base stations necessary for a position determination in the prior art, a position determination may be independently verified to a high degree of confidence.

Additionally, a technical advantage of the present invention is realized in the fact that the method for determining position requires few modifications to systems in common use today and, therefore, is a cost effective and easy to implement solution to the mobile unit location problem.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which:

FIG. 1 illustrates a typical cellular communication system, utilizing multiple beams;

FIG. 2 illustrates a positional arc, representing an outboard distance from a base station, to which the position of a particular mobile may be narrowed based on communication beam and distance information;

FIG. 3 illustrates time differential of arrival information arcs utilized to determine the position of a particular mobile; and FIG. 4 illustrates the interconnection of the base transceiver stations of a typical cellular communication system and an E-9-1-1 center.

DETAILED DESCRIPTION

Directing attention to FIG. 1, a typical arrangement of multibeam cellular base stations may be seen as BTSs 110, 120, and 130. It shall be appreciated that each of the illustrated BTSs provides communication coverage throughout a predefined area through the use of twelve narrow beams, shown as beams 1 through 12 associated with each BTS. Each of these beams provides substantially 30° azimuthal coverage and are arranged such that their composite radiation pattern provides 360° coverage about the associated BTS. Each of the BTS's composite radiation patterns are arranged to provide cellular coverage as is in common use today with respect to cellular telephony.

The azimuthal arrangement of the co-located beams of the BTSs provides a different "view" for each of the beam sources. This different view results in each beam source having angular diversity such that each beam source receives a different signal wave front. The importance of this angular diversity to various embodiments of the present invention will be made more evident in the discussion below.

It shall be appreciated that, although the disclosed embodiments of the present invention utilize twelve beam systems, systems providing different numbers of beams, and even a single beam, may be used. However, it shall be appreciated that the more narrow the beams used, the more likely a mobile unit's signal will be detectable on a plurality of the beams, as is necessary in utilizing the present invention.

It will be understood that the method of determining a mobile unit's position of the present invention may be utilized in any number of wireless communication systems, such as those providing personal communications services (PCS), and is not limited to the cellular telephony system discussed herein.

Referring again to FIG. 1, mobile unit 140 is illustrated operating within beam 9 of BTS 110. It is this mobile unit for which a position determination is to be made in the example determinations discussed herein.

In a first preferred embodiment of the present invention, the determination of the position of mobile unit 140 may be made from information available at only BTS 110. It shall be appreciated that the determination of position with reference to a single base station is advantageous where the particular mobile unit, for which position information is desired, is located such that only a single BTS is in communication therewith. For example, many rural areas are sparsely populated with base stations as the economics associated with their deployment demand their placement so as to service a maximum area. Such wide spacing of base stations results in many locations throughout their service area where a mobile unit's signal may be detectable at only a single BTS.

Likewise, as a position determination utilizing information from a plurality of BTSs necessarily requires intercommunication of this information, it may be advantageous to utilize a single BTS in a position determination. For example, where intercommunication of BTSs is slowed due to heavy utilization, reference to a single BTS may be preferred for the position determination, at least for an initial location fix. This initial fix can be refined as time goes on to yield increasingly more accurate location data.

In order to make a position determination with reference to only one BTS according to the present invention, an information map of the BTSs service area must have first been made. Such an information map may be made by recording various communication attributes of a signal received at the BTS while a test system is operated within the service area.

As the test system is operated, the recorded communication attributes are associated with the position from which the test system transmitted the signal for which the attributes were recorded. The position of the test system may be determined, for example, by an operator's reference to known landmarks. Similarly, the creation of the information map may include the use of positioning technology at the test system such as a global positioning system (GPS). This way the test system could accurately determine its position by reference to geosynchronous satellites at each position for which test signal attributes are recorded. It shall be appreciated that such systems may be fully integrated into the test system such that when a test signal is transmitted, so to is the position from which the signal was transmitted. Thereafter, the BTS mapping the information could identify the signal attributes recorded for various of the beams with the position information provided by the GPS.

The communication attributes recorded by the BTS preferably consist of either signal strength information, or TDA information of the signal as received on the various beams of the BTS for different locations within the service area of the BTS. It shall be appreciated that the recording of this information requires very little modification to base stations in use today. For example, relative signal strength indications (RSSI) are generally already in use at a BTS in order to make hand-off decisions. Systems utilizing such measurements for communication management are disclosed in the above-referenced co-pending commonly assigned U.S. patent application entitled "System and Method for Cellular Beam Spectrum Management."

The calculation of arrival time difference of a signal simply requires comparing the time the test signal was received at various beams of the BTS. Therefore, the recording of this information requires little more than the addition of control algorithms and the utilization of data storage capacity accessible by the BTS.

Determination of the mobile's position by a single BTS according to the present invention requires the use of a multibeam system, because it is the difference between communication attributes of the signal at various ones of the multiple beams which provides the system with the ability to determine a precise location. For example, mobile unit 140 illustrated in FIG. 1 may transmit a signal which is received on beams 8, 9, and 10 of BTS 110. If the signal strength of a single beam, such as beam 9, were used to make the position determination, an arc segment through this beam representing the distance from the BTS consistent with the level of signal attenuation is as accurate of location determination as can be made. Moreover, the accuracy of this arc may be effected by obstructions in the signal path between the mobile unit an the BTS.

A positional arc assuming no, or insubstantial, signal obstruction, is shown in FIG. 2 as arc 200. It can be seen that mobile unit 140 could be located anywhere along arc 200, such as at position 210, and still result in the signal strength measured by BTS 110.

However, where the signal strengths of each of beams 8, 9, and 10 are used, an accurate position may be determined. This is so because, although there may be multiple positions in the one beam from which the signal may result in the same signal strength on that beam, the combination of signal strengths of the additional beams pinpoints the location. For example, in FIG. 2 mobile unit 140 is illustrated within beam 9 positioned nearer to beam 10 than to beam 8. This relative position can be expected to result in a stronger signal at beam 10 than at beam 8.

Therefore, although the position of the mobile unit associated with a particular signal strength within beam 9 may be anywhere along arc 200 as discussed above, the signal strength detected on beams 8 and 10 will vary depending on the unit's azimuthal position. For example, if mobile unit 140 were located at position 210, the signal strength of beam 8 would be expected to be stronger than that of beam 10. As such, a map of signal strengths of various beams associated with positions throughout the BTS service area may be utilized to accurately determine the mobile unit's position.

Similarly, TDA information of the signal received on various of the beams may be utilized to determine the mobile's position. Here, however, the time difference of the signal as received on the various beams is recorded. For example, referring again to FIG. 2, the time difference of the signal of mobile unit 140 between the signal received by beam 9 and 10 will be less than the time difference between the signal received by beam 9 and 8. This is so because the mobile unit is located nearer beam 10 than beam 8. However, if the mobile unit were to move, for example, to position 210 the time difference between the signal received by beam 9 and 10 will be greater than the time difference between the signal received by beam 9 and 8. As in the signal strength embodiment discussed above, recording exemplary sets of this TDA information and the associated position information, can be used to enable latter determinations of position through referencing TDA information. Of course, TDA information can also be calculated, not measured, and used relatively in order to determine position.

Of course, both signal strength and TDA information may be recorded in the information map, if desired. For example, the mobile's position may be independently verified by referencing such dual information sets.

Similarly, a combination of information recorded in the information map and information measurable or determinable real-time may be used according to the present invention. For example, measured TDA information may be used in combination with a recorded signal strength map in the location determination.

It shall be appreciated that using a location map as described above is not feasible in a typical omni or three sector system since there can be multiple locations within the coverage of a sector having the same signal strength or TDA values where the signal is not detectable within another sector of the system. However, by using a multibeam antenna system, one can consistently record the signal strength on more than just a single beam. Therefore, if the mobile has the same signal strength on a particular beam at various locations within the coverage of that beam, the probability of having the same signal strength reading at multiple locations on multiple beams is very low.

It shall be understood that, although an information map containing a great many positions and their associated communication attributes may be recorded through the use of the above described test system, many of the mobile unit's positions may be interpolated or extrapolated by reference to empirically measured data sets. Such position information interpolation may be utilized to determine positions to within varying degrees of accuracy depending on the amount of empirical data available. As such, a tradeoff exists between the number of test positions sampled, and therefore the amount of actual information storage space utilized, and the accuracy of the position determination. However, as regulations require a degree of accuracy to within 300 (or some other finite number) feet, clearly some interpolation of position information may be utilized. Regardless of the resolution of the position determination chosen, this preferred embodiment of the present invention requires the preparation of a information map having recorded therein exemplary positioning information.

To avoid the use of such mapping techniques, a second preferred embodiment of the present invention utilizes two BTSs, at least one of which having narrow beams, to determine the position of the mobile unit. As above, this embodiment may utilize signal strength and TDA information in its determination of the mobile's location. However, as two spatially diverse base units are utilized in the position determination, the mapping of this information in advance of the determination is not necessary.

Directing attention once again to FIG. 1, it can be seen that, although mobile unit 140 is located within the service area of BTS 110, both BTS 120 and BTS 130 have beams directed toward the mobile unit. Specifically, beam 2 of BTS 120 and beam 5 of BTS 130 are disposed to "see" mobile unit 140.

It shall be appreciated that, although the communication beams of BTSs 120 and 130 are intended to provide communication coverage within the service area demarcated by the cellular pattern, these beams typically will be able to detect the signals of mobiles operating beyond the cell's boundary. However, to avoid interference caused by mobile units operating within the service area of other BTSs, different communication channels are typically assigned for use on neighboring BTSs and/or their beams able to communicate with a single mobile unit. Therefore, BTSs utilized to make position determinations according to the present invention are preferably adapted to monitor not only its own control channel, but also the control channels of neighboring BTSs. It shall be appreciated that monitoring of the neighboring BTS's control channel provides a convenient means by which a BTS may detect the presence of a mobile unit although not operating within the base station's own service area. Of course, a voice channel or other characteristic signal may also be used according to the present invention.

Through the use of two BTSs, the mobile unit's location may be determined by a first BTS determining the strongest narrow beams upon which the mobile's signal appears. The position of the mobile is typically within one such beam as the strongest signal indicates the shortest, most direct route, between the mobile and the base. Of course, other methods of determining the beams the mobile is most likely operating within may be used, if desired.

Directing attention again to FIG. 1, mobile unit 140 is located within beam 9 of BTS 110, near the boundary with beam 10 of BTS 110. Presumably, these two beams will provide the strongest signal to BTS 110. For example, beam 9 will provide the strongest signal, provided no structures obscure the signal path, as this is the shortest most direct route. Likewise, beam 10 will provide the second strongest signal as it provides the second shortest signal route.

However, the signal strength information alone is insufficient to determine the position of the mobile. Such information merely provides information regarding the distance between the mobile unit and the BTS, such as the positional arc discussed above.

To precisely determine the location of the mobile unit according to this preferred embodiment, the second BTS uses TDA information to independently determine two possible positions for the mobile. Referring to FIG. 3, the use of this TDA information to determine the position of mobile unit 140 is shown. It shall be appreciated that, by monitoring the control channel, voice channel, or the like of BTS 110, BTS 120 may detect signals transmitted by mobile unit 140. For example, as beam 2 of BTS 130 is disposed to view mobile unit 140, this beam is likely to detect its transmissions. As previously discussed, BTS 110 has determined beams 9 and 10 to be receiving the strongest signal from mobile unit 140.

Receiving the mobile unit's signal on beams 9 and 10 of BTS 110 and beam 2 of BTS 120 provides the system with three signal reception times necessary to make two TDA calculations. Of course, to make these TDA calculations involving signals detected at two different BTSs, communication between the BTSs is necessary. Such communication may be provided by a network control system already in place to provide system control for such items as hand offs, resource assignments, etcetera. Moreover, the position determinations of the present invention may be made by such a network control system rather than by logic disposed at the various BTSs of the system. Systems adaptable to provide such intercommunication between BTSs as well as the logic to make the described position determinations are disclosed in the above-referenced co-pending commonly assigned U.S. patent application entitled "Method and Apparatus for Improved Control Over Cellular Systems."

Directing attention to FIG. 4, interconnection of the various BTSs illustrated in FIG. 1 is shown. It shall be appreciated that, although BTS 110 and BTS 130 are shown interconnected through BTS 120, any means of interconnection, either direct or indirect, may be used. For example, the BTSs may all be indirectly connected through a base controller station (BCS) or a mobile switching office (MSO), where desired.

Referring again to FIG. 3, the TDA information between the signal received by beam 9 of BTS 110 and beam 2 of BTS 120 is represented as arc 310 and the TDA information between the signal received by beam 10 of BTS 110 and beam 2 of BTS 120 is represented as arc 300. It shall be appreciated that, due to the above described angular diversity, the signal transmitted by mobile unit 140 will be received at beam 9 before being received at beam 10, provided of course there are no obstructions in beam 9. When this information is compared to the arrival time of the signal at beam 2 of BTS 120, there will be a greater time difference of arrival between beams 2 and 9 than between beams 2 and 10.

The possible positions of mobile unit 140 having the two determined time differences of arrival may be partially represented by arcs, such as arc 300 and 310, having different curvature representing a greater or lesser difference. It shall be appreciated that by having only one TDA calculation, the same uncertainty of position is presented as with the signal strength information alone as discussed above. However, utilizing two such TDA calculations, the crossover points of the associated arcs narrows the possible positions to two.

Thereafter, the precise location determination may be made by comparing the single position of these two possible positions which falls within the beams having the strongest signal. Here, the position of mobile unit 140 will be the crossover point of arcs 300 and 310 which is located within beam 9 of BTS 110.

It shall be appreciated that the position determination of this preferred embodiment of the present invention utilizes multiple beams at only one of the two base stations. As such, it is possible to make a precise determination of position in a cellular network even where not fully populated with multibeam BTSs.

Where additional base stations are capable of detecting a mobile unit's signal, such additional BTSs may be utilized in the position determination to provide position verification or an additional degree of confidence to the determination.

Therefore, a third preferred embodiment utilizes a third BTS in the position determination of the mobile. It shall be appreciated that the combination of three base stations, like the aforementioned triangulation technique, does not require the use of multiple beams at any of the base stations the position determination.

Preferably, this third BTS is used to verify the position determination as made by two base stations described above. Through the use of TDA calculations based on the mobile unit's signal received on a beam of the third BTS and those of the first BTS, the third BTS is able to independently confirm the mobile's position as determined through the use of two base stations. Such independent confirmation is able to reveal anomalous position determinations and, thus, provide a higher level of confidence in the mobile's location.

For example, referring again to FIG. 1, BTS 130 may be able to detect the signal of mobile unit 140 on beam 5 much like described for BTS 120 and beam 2. Thereafter, TDA calculations may be made for the signal received by beam 9 of BTS 110 and beam 5 of BTS 130 and the signal received by beam 10 of BTS 110 and beam 5 of BTS 130. This will provide a point located within beam 9 of BTS 110 from which the position of mobile unit 140 may be independently verified.

It shall be appreciated from the above discussion that utilizing three base stations, as is required by current triangulation methods, allows the present invention to provide an additional degree of confidence in the position determinations made. Of course, the use of this third BTS is not necessary for the position determination and may be omitted, if desired.

Similarly, an information map may be utilized in conjunction with, or in the alternative to, the multi-BTS methods described above. For example, the information map may be utilized to confirm the location determination made by the two BTS method. Likewise, the memory map may be utilized in the event that heavy communication network traffic impedes or slows communication between the two BTSs monitoring the mobile unit's communication attributes.

Likewise, these different methods may be utilized to provide more accurate determinations of a mobile unit's position. For example, a method providing less accuracy, but providing a hasty determination, may initially be used. Thereafter, a method providing greater accuracy, but a delayed determination, may be used to pinpoint the mobile unit's position.

Moreover, multiple determinations as to a mobile unit's location may be made by the present invention. For example, the method used to make an initial location determination may be repeated at a certain time interval to confirm the initial determination. Similarly, where a temporary anomaly provides an initially inaccurate location determination, later determinations will reflect a more accurate determination when the anomaly has dissipated.

Regardless of the method used to determine the mobile unit's position, the present invention may communicate this determination to any number of systems utilizing such information. For example, the location information may be communicated to a BCS or MSO, or any other system controlling functions of the communication network, for use in network control decisions. Moreover, the location itself can be sent to the other system, or the information used to determine the location may be sent in its stead. Accordingly, the location may be determined at the cell site or at the controlling center.

Preferably, the location information is communicated to an E-9-1-1 center for use in locating the source of an emergency call. This information may be communicated upon a determination of position and may be updated thereafter upon refinement or updating of the location determination. The communication of location information to the E-9-1-1 center may be through a public switched network (PSN) as illustrated in FIG. 4, or may be by other means, such as direct lines coupling the communication network with the E-9-1-1 center.

Of course, the location information provided by the present invention may be utilized for services other than the aforementioned E-9-1-1 service. For example, location information may be useful in providing specialized service options. Such options might include billing based on caller location, availability of optional or enhanced services based on caller location, or the like.

Additionally, the communication between the communication network and the service may be bi-directional. For example, once location information is communicated to the E-9-1-1 center, the E-9-1-1 center may respond with instructions for the communication system to lock the channel used by the mobile unit for updated or refined location determinations. Likewise, the instructions provided to the communication network by the E-9-1-1 center may include a request for additional location resources be used in subsequent location determinations. For example, the request may be for verification of the location determination by one of the above discussed methods not used in the original location determination. Of course, the present invention may instigate these instructions on its own accord in addition to, or in the alternative, to the E-9-1-1 system daily so, if desired.

It shall be appreciated that the above discussion has assumed substantially direct communication between the mobile unit and the various BTSs in order to simplify the description of the inventive concepts involved. However, it shall be appreciated that the methods of the present invention will provide an accurate determination of a mobile unit's position even when multipath signal reflections or other signal anomalies cause by structures are introduced. For example, the information map of the first preferred embodiment will simply record exemplary information which includes the effects of these signal anomalies.

Similarly, utilization of two BTSs to determine the mobile's position will use the strongest signals (presumably a direct or nearly direct signal path) to determine the mobile's position from two possibilities determined from TDA information. The use of these two position determining techniques, both signal strength and TDA information, tends to ameliorate the effects of these signal anomalies. Of course, as previously discussed, the effects of these signal anomalies may be further ameliorated through the use of redundant position determinations such as the use of information maps or signal detection at additional BTSs, if desired.

Although the present invention and its advantages have been described in detail, it should be understood that various changes, substitutions and alterations can be made herein without departing from the spirit and scope of the invention as defined by the appended claims.

What is claimed is:

1. A system for determining the position of a wireless communication unit operating in a wireless communication system having a plurality of communication arrays wherein at least a first communication array includes a plurality of radiation beams disposed to provide angular diversity, said system comprising:

means for identifying at said first communication array of said plurality of communication arrays a first and second radiation beam of said plurality of radiation beams detecting a signal associated with said wireless communication unit;

means for ascertaining a first time differential between said signal detectable at said first beam at said first communication array and said signal as detectable at a second communication array, said means also for ascertaining a second time differential between said signal detectable at said second beam at said first communication array and said signal as detectable at said second communication array; and means operable with said identifying means and said ascertaining means for determining a position of said wireless communication unit.

2. The system of claim 1, further comprising:

means for redetermining the position of said wireless communication unit.

3. The system of claim 2, wherein said position redetermination is made to confirm a previous position determination.

4. The system of claim 2, wherein said position redetermination is made to update a previous position determination.

5. The system of claim 2, wherein said position redetermination is made to refine a previous position determination.

6. The system of claim 1, wherein ones of said plurality of radiation beams are narrow beams having a beam width of less than 120°.

7. The system of claim 1, wherein said wireless communication system comprises a cellular telephone communication system.

8. The system of claim 1, wherein said wireless communication system comprises a personal communication services system.

9. The system of claim 1, wherein said determining means is operable with an 9-1-1 system to provide caller location data substantially contemporaneously with an emergency call from said wireless communication unit.

10. The system of claim 9, wherein said data is provided to said 9-1-1 system utilizing a link from the group consisting of a public switched network, a private communication line, and a private wireless link.

11. The system of claim 1, wherein said determining means is operable with a communication controller of said wireless communication system.

12. The system of claim 1, further comprising:

means for recording a plurality of sample communication data sets including at least one communication attribute as detectable on ones of said radiation beams associated with said first communication array;

means for associating ones of said plurality of sample data sets with particular location within a predefined service area associated with said first communication array; and means for comparing attributes of said signals detected on said first and second beams with said sample communication data sets.

13. The system of claim 12, wherein said sample data sets comprise receive signal strength information.

14. The system of claim 12, wherein said sample data sets comprise signal time differential of arrival information.

15. The system of claim 12, wherein said comparing means is independently operable to ascertain a position of said wireless communication unit.

16. The system of claim 15, wherein said comparing means is operable to provide said independently ascertained position to an 9-1-1 system to provide additional caller location data.

17. The system of claim 15, wherein said determining means is operable to confirm said position ascertained by said comparing means.

18. The system of claim 12, wherein said comparing means is operable to confirm said position determined by said determining means.

19. The system of claim 12, wherein said comparing means is operable to update said position determined by said determining means.

20. The system of claim 12, wherein said comparing means is operable to refine said position determined by said determining means.

21. The system of claim 12, wherein said independently operable comparing means is operable to ascertain a position substantially real time and said means for determining a position is operable dependent upon communications available between said first communication array and said second communication array.

22. The system of claim 1, further comprising:

means for ascertaining a third time differential between said signal detectable at said first beam at said first communication array and said signal as detectable at a third communication array, said means also for ascertaining a fourth time differential between said signal detectable at said second beam at said first communication array and said signal as detectable at said third communication array.

23. The system of claim 22, wherein said ascertaining means is operable with said identifying means to independently determine a position of said wireless communication unit.

24. The system of claim 23, wherein said independently ascertained position is provided to an 9-1-1 system to provide additional caller location data.

25. The system of claim 23, wherein said determining means is operable to confirm said independently determined position.

26. The system of claim 22, wherein said independently determined position is utilized to confirm said position determined by said determining means.

27. The system of claim 22, wherein said independently determined position is utilized to update said position determination by said determining means.

28. The system of claim 22, wherein said independently determined position is utilized to refine said position determination by said determining means.

29. The system of claim 1, further comprising:

means for locking a communication channel associated with said wireless communication unit for subsequent use in determination of a position of said wireless communication unit.

30. The system of claim 1, further comprising:

means for activating select other resources in said wireless communication system suitable for use in determination of a position of said wireless communication unit, said select other resources being in addition to the identifying means, ascertaining means, and determining means.

31. The system of claim 30, wherein said activating means is operable upon instruction from a 9-1-1 system.

32. A method for determining the position of a communication unit operating in a communication system having a plurality of communication base stations, said base stations having associated therewith a plurality of directional radiation beams, said method comprising the steps of:

identifying at a first base station of said plurality of base stations a first beam of said plurality of beams having a first desired signal attribute associated with said communication unit;

identifying at said first base station a second beam of said plurality of beams having a second desired signal attribute associated with said communication unit;

ascertaining a first time differential of arrival between a signal detectable at said first beam at said first base station and said signal as detectable at a beam at a second base station;

ascertaining a second time differential of arrival between a signal detectable at said second beam at said first base station and said signal as detectable as a beam at said second base station; and determining a physical position of said communication unit by identifying an intersection point of intersection points of arcs associated with said first time differential of arrival and said second time differential of arrival located in one of said first and second beams.

33. The method of claim 32, further comprising the step of:

utilizing said determination made in said determination step with an E-9-1-1 system.

34. The method of claim 32, further comprising the step of:

utilizing said determination made in said determination step at least in part to control said communication system.

35. The method of claim 32, further comprising the steps of:

recording a plurality of sample communication data including at least one communication attribute as detectable at ones of said beams associated with said first base station;

associating data of said plurality of sample data with a particular physical location; and comparing attributes of said signals detected on said first and second beams with said sample communication data.

36. The method of claim 35, wherein said sample data comprise receive signal strength information.

37. The method of claim 35, wherein said sample data sets comprise signal time differential information.

38. The method of claim 35, further comprising the step of:

utilizing said comparison made in said comparison step to verify said determined physical position of said communication unit.

39. The method of claim 35 further comprising the step of:

determining a physical position of said communication unit including reference to said comparison step.

40. The method of claim 32, further comprising the steps of:

ascertaining a third time differential of arrival between a signal detectable at said first beam at said first base station and said signal as detectable at a beam at a third base station; and ascertaining a fourth time differential of arrival between a signal detectable at said second beam at said first base station and said signal as detectable at said beam at said third base station.

41. The method of claim 40, further comprising the step of:

utilizing said third and fourth time differentials to independently determine a physical position of said communication unit.

42. The method of claim 40, further comprising the step of:

utilizing said third and fourth time differentials to confirm said physical position determined at said determining step.

43. A system for determining the location of a radio operating within a cellular communication network having a plurality of base transceiver stations, said base transceiver stations having a plurality of narrow radiation beams disposed to provide angular diversity, wherein said location determination is utilized by a substantially automated 9-1-1 service, said system comprising:

means for identifying at a first base transceiver station of said plurality of base transceiver stations a first and second radiation beam of said plurality of radiation beams having respectively a first strongest and a second strongest receive signal associated with said radio;

means for ascertaining a first time differential of arrival between a signal received at said first beam identified with said first strongest signal at said first base transceiver station and said signal as received at a beam at a second base transceiver station, wherein said first and second base transceiver stations provide adjacent areas of communication coverage;

means for ascertaining a second time differential of arrival between a signal received at said second beam identified with said second strongest signal at said first base transceiver station and said signal as received at said beam at said second base transceiver station;

means operable with said identifying means and said ascertaining means for determining a position of said radio; and means for communicating said determined position to said 9-1-1 service.

44. The system of claim 43, wherein said identifying means is operable with relative signal strength indications as provided by said base transceiver station.

45. The system of claim 43, further comprising:

means for verifying said position determined by said determining means.

46. The system of claim 43, further comprising:

means for refining said position determined by said determining means.

47. The system of claim 43, further comprising:

means for updating said position communicated to said 9-1-1 service.

* * * * *